United States Patent [19]

Titcomb et al.

[11] Patent Number: 5,112,142
[45] Date of Patent: May 12, 1992

[54] HYDRODYNAMIC BEARING

[75] Inventors: Forrest Titcomb; Jackie Cordova, both of Colorado Springs, Colo.

[73] Assignee: Digital Equipment Corporation, Maynard, Mass.

[21] Appl. No.: 382,251

[22] Filed: Jul. 19, 1989

Related U.S. Application Data

[60] Continuation of Ser. No. 233,289, Aug. 17, 1988, abandoned, which is a division of Ser. No. 84,985, Aug. 12, 1987, Pat. No. 4,795,275.

[51] Int. Cl.$^5$ .................. F16C 32/06; F16C 33/74; F16J 15/40
[52] U.S. Cl. .................. 384/107; 277/80; 384/119; 384/132
[58] Field of Search ........ 384/110, 100, 107, 111–121, 384/124, 130–133, 152, 144, 446, 478, 488; 277/80, 135

[56] References Cited

U.S. PATENT DOCUMENTS

| 2,325,283 | 1/1939 | Swearingen . | |
|---|---|---|---|
| 3,107,950 | 1/1961 | Kleven . | |
| 3,232,680 | 2/1966 | Clark | 384/110 |
| 3,325,231 | 6/1967 | Ono | 384/132 |
| 3,726,574 | 4/1973 | Tuffias et al. | 277/80 X |
| 3,746,407 | 7/1973 | Stiles | 277/80 X |
| 3,917,366 | 11/1975 | Mason | 384/110 |
| 3,998,501 | 12/1976 | Cyphelly | 384/113 |
| 4,043,612 | 8/1977 | Orcutt | 384/133 X |
| 4,254,961 | 3/1981 | Feisht et al. | 277/80 |
| 4,274,684 | 6/1981 | Richfield . | |
| 4,444,398 | 4/1984 | Black, Jr. et al. | 277/80 X |
| 4,526,484 | 7/1985 | Stahl et al. | 384/133 |
| 4,565,379 | 1/1986 | Ballhaus | 277/80 X |
| 4,630,943 | 12/1986 | Stahl et al. | 277/135 X |
| 4,694,213 | 9/1987 | Gowda et al. | 384/133 X |

FOREIGN PATENT DOCUMENTS 1525198 8/1969 Fed. Rep. of Germany .

Primary Examiner—Thomas R. Hannon
Attorney, Agent, or Firm—Fish & Richardson

[57] ABSTRACT

A rotatable shaft/thrust plate combination is disposed within a sleeve to form a first clearance space between the shaft and the sleeve and a second clearance space between the thrust plate and the sleeve. The external faces of the thrust plate are exposed to air. The clearance spaces are filled with a liquid lubricant and the sleeve includes pressure equalization ports connecting the first and second clearance spaces. Surface tension dynamic seals are provided between axially extending surfaces of the thrust plate and sleeve. The equalization ports balance the hydrodynamic pressures in the lubricant to prevent the lubricant being pumped through one of the dynamic seals. The resulting bearing provides high precision with low repetitive and nonrepetitive runouts. The bearing provides hydrodynamic support of both radial and axial loads and the bearing seal is relatively insensitive to orientation of the spindle and minimizes the generation of debris and cotaminating particles.

54 Claims, 5 Drawing Sheets

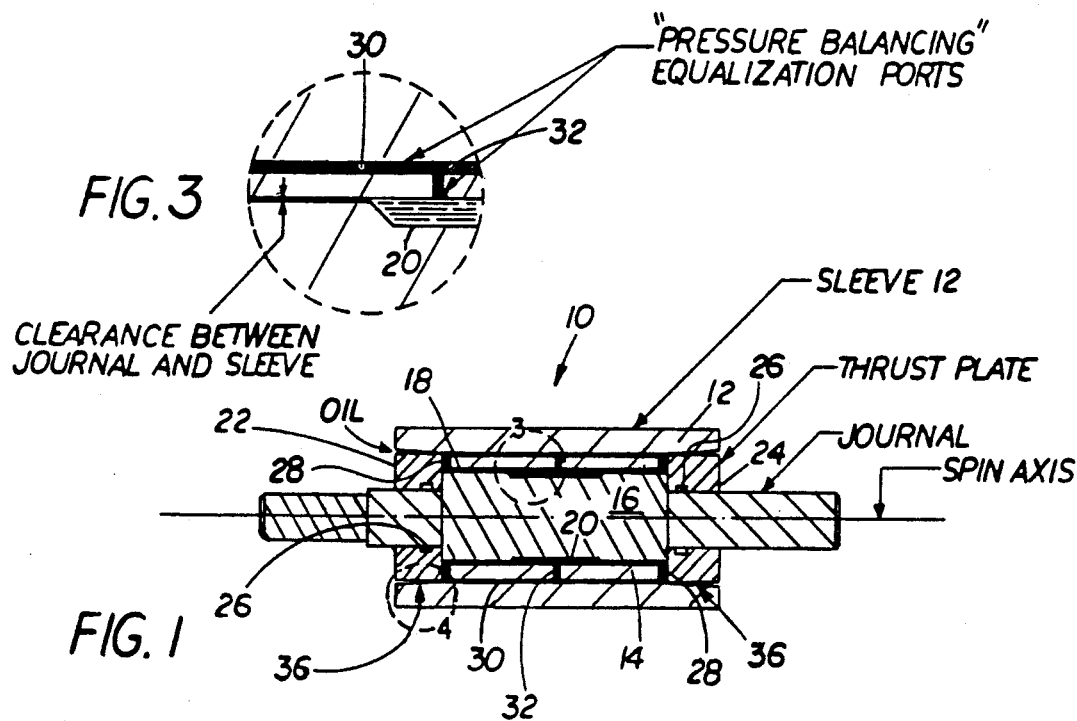
FIG. 3
FIG. 1
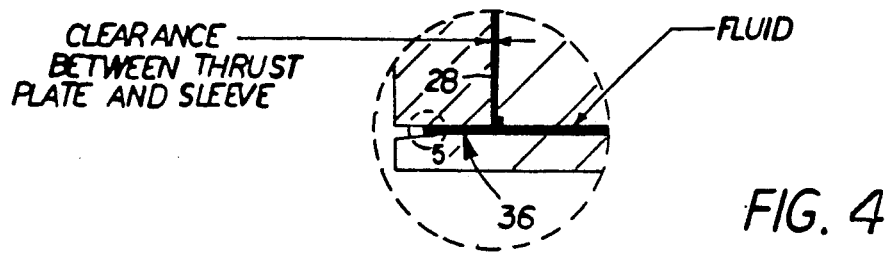
FIG. 4
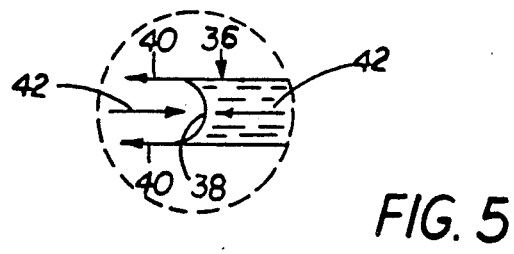
FIG. 5

HYDRODYNAMIC BEARING

This is a continuation of application Ser. No. 07/233,289 filed on Aug. 17, 1988, now abandoned, which is a divisional of co-pending application Ser. No. 084,985 filed on Aug. 12, 1987 now U.S. Pat. No. 4,795,275.

BACKGROUND OF THE INVENTION

This invention relates to precision hydrodynamic bearings.

One important limitation to increasing track density of computer disk drives is spindle bearing performance. A disk drive whose spindle bearing has low runout can accommodate higher track densities which results in more data storage capacity per disk.

The kinematics of the spin axis of a spindle bearing determine the precision of the bearing. As the journal spins relative to the sleeve, the spin axis may trace out a path or orbit. The motion of this axis typically has components that are synchronous with the spin and repetitive in nature. These motions are termed repetitive runout. Other components of spin axis motion may be asynchronous and nonrepetitive with respect to spin. These components are termed nonrepetitive runout. As a general rule, spindle bearing precision is increased as repetitive and nonrepetitive runouts are decreased.

Ball bearing spindle systems make up the majority of prior art disk drives. The kinematics of the rolling elements in ball bearings result in relatively large nonrepetitive runout. This results from the fact that the lubricant film thicknesses in ball bearings are very thin providing little attenuation of geometric defects in the bearing. In addition, ball bearings produce forces on the disk drive structure to which it is attached which are of relatively high frequency and large amplitude.

Hydrodynamic spindle bearing designs are also known. The Hewlett-Packard Model No. 9154A, 3.5 inch micro-Winchester disk drive incorporates a hybrid hydrodynamic ball bearing spindle. The performance of this bearing is degraded by the incorporation of the ball bearings. The Phillips video 2000 videocassette recorder utilizes a hydrodynamic bearing which employs grease as the lubricant limiting operation to low speeds. Other known hydrodynamic spindle bearings for disk drives employ a ferromagnetic fluid as the lubricant for the bearing. This fluid is retained or sealed in the bearing by magnetic fields set up in pole pieces at each end of the bearing. Unless the magnetic fields and clearances are very precisely matched at each end of the bearing, one seal will be stronger than the other and when the bearing heats up, the lubricant can be spilled. See U.S. Pat. No. 4,526,484.

SUMMARY OF THE INVENTION

In general, the hydrodynamic bearing according to the instant invention includes a rotatable shaft/thrust plate combination disposed within a sleeve forming a first clearance space between the shaft and the sleeve and a second clearance space between the thrust plate and the sleeve. The external faces of the thrust plate are exposed to air and the clearance spaces are filled with a liquid lubricant. The sleeve includes pressure equalization ports connecting the first clearance space and the second clearance space. In a preferred embodiment, the bearing includes surface tension dynamic seals between axially extending surfaces of the thrust plate and sleeve. These axially extending surfaces of the thrust plate and sleeve diverge toward the ends of the bearing to form the dynamic seal. The divergence may be a straight taper having an angle of approximately 2°. The pressure equalization ports include axially extending passageways in communication with radially extending passageways to connect the first and second clearance spaces. The radially extending passageways may be located near the center of the bearing. The bearing may also include relief patterns in opposed sleeve/thrust plate faces to generate inwardly directed radial forces.

In one embodiment of the invention, the bearing includes a cylindrical sleeve including a portion having a smaller inside diameter. A shaft including a portion having a diameter adapted to form a first clearance space with respect to the smaller diameter portion of the sleeve fits within the sleeve. A pair of thrust plates are disposed on the shaft to form second clearance spaces with respect to radially extending faces of the smaller diameter portion of the sleeve, the external faces of the thrust plate being exposed to the air. The clearance spaces are filled with a liquid lubricant. The smaller diameter portion of the sleeve includes plural axially extending passageways in liquid communication with radially extending passageways interconnecting the first and second clearance spaces. Surface tension seals are provided between the thrust plates and sleeve.

Another aspect of the invention is a method for introducing lubricant into the hydrodynamic bearing to avoid incorporating air. The bearing is placed in a vacuum chamber above a liquid lubricant and the chamber is evacuated to a pressure below atmospheric pressure. The bearing is submerged into the lubricant and the pressure in the chamber is raised to atmospheric pressure which forces the lubricant into the clearance spaces in the bearing. After the bearing is filled, it can be exposed to ultrasonic energy to expel any residual air. The vacuum chamber can also be repeatedly cycled between a high and a low pressure to expel residual air.

In another, particularly preferred embodiment of the invention, the bearing incorporates both external and internal surface tension seals at each end of the bearing. In this embodiment, there is an air space between the two ends of the bearing. This embodiment results in a reduced evaporation rate from the seals, improved moment stiffness, and faster thermal transient response.

In yet another aspect of the invention, the shaft and sleeve include mating tapered portions at each end of the bearing defining lubricant filled clearance spaces for supporting radial and axial loads. Each clearance space is sealed by an internal and an external surface tension dynamic seal and pressure equalization ports are provided to connect the internal and external seals. In this embodiment, the shaft is a continuous unit without a separate thrust plate portion. No 0 ring seals are required.

The hydrodynamic bearing of the instant invention achieves lower levels of runout than ball bearings as a result of a thick film of lubricant which separates the sliding metal surfaces. This film provides a high degree of viscous damping which significantly attenuates nonrepetitive runout to levels which are less than state of the art rolling element bearings. In addition, the bearing generates forces on the structure attached to it which are low frequency and low amplitude relative to ball bearings. This reduction in the forcing function bandwidth and amplitude minimizes other vibrations in the disk drive and further improves tracking performance.

The pressure equalization ports reduce pressure differentials which are caused by pumping actions inside the bearing. Because of the pressure balancing, the bearing does not tend to pump lubricant in a preferential manner through one seal or the other. Thus, only the external pressure differential across the bearing influences the position of the dynamic seal interfaces. The surface tension seals of the present invention do not leak nor do they generate solid debris.

BRIEF DESCRIPTION OF THE DRAWING

FIG. 1 is a cross sectional view of the bearing of the invention;

FIG. 3 is an expanded view of a portion of FIG. 1;

FIG. 4 is an expanded view of a portion of FIG. 1;

FIG. 5 is an expanded view of a portion of FIG. 4;

DESCRIPTION OF THE PREFERRED EMBODIMENT

Figure 2:
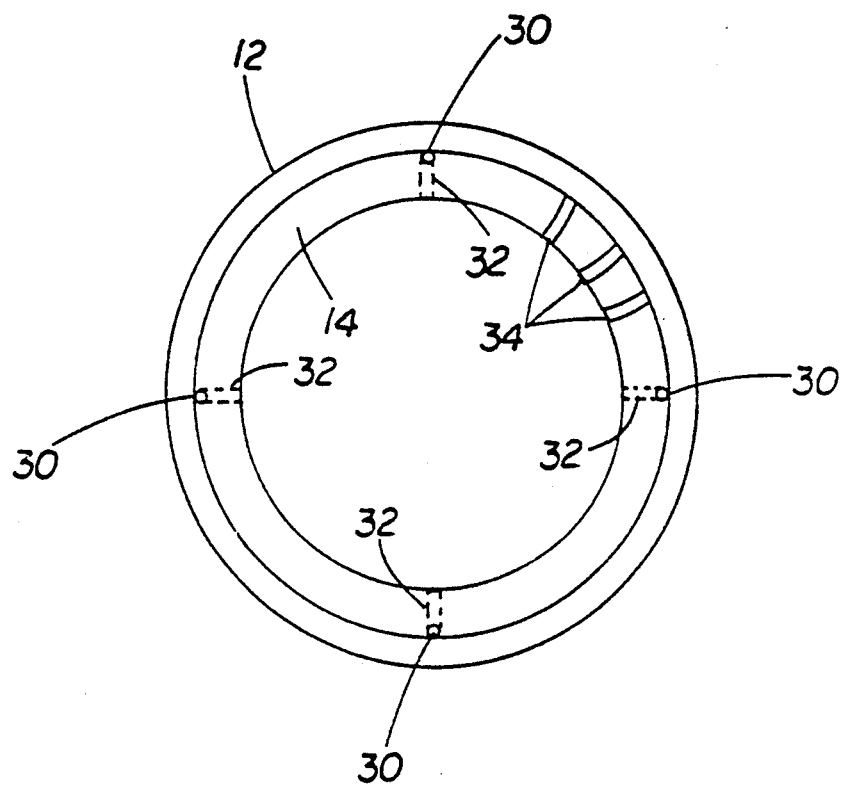
FIG. 2 is an elevational view of the sleeve portion of the bearing.

A hydrodynamic bearing 10 shown in FIG. 1 includes a sleeve 12 including a portion of smaller inside diameter 14. A journal or shaft 16 fits within the sleeve 12 forming a first clearance space 18. The journal 16 may include a recess 20. Thrust plates 22 and 24 rest on the journal 16 and are sealed by means of O-ring seals 26. The thrust plates 22 and 24 form second clearance spaces 28 with respect to radially extending surfaces of the smaller inside diameter portion 14 of the sleeve 12. The portion 14 of the sleeve 12 also includes axially extending passageways 30 and radially extending passageways 32. As shown in FIG. the passageways 30 and 32 are arranged around the circumference of the sleeve 12. Four sets of passageways 30 and 32 are shown in FIG. 2 but more or fewer may be employed. FIG. 2 also shows spiral relief patterns 34. These relief patterns cooperate with patterns on the journal to generate radially directed inward hydrodynamic pressure.

Relative rotation between the journal 16 and the sleeve 12 is provided for by the clearance spaces 18 and 28. Suitable dimensions for the clearance spaces 18 and 28 are 0.0002 to 0.001 inches and 0.0005 to 0.002 inches, respectively. These clearance spaces are filled with a lubricant such as oil which reduces wear between the journal and sleeve and provides a medium through which a hydrodynamic pressure field may be generated. Relative rotation or radial motion between the journal 16 and sleeve 12 is required to set up the hydrodynamic pressure field. The hydrodynamic bearing 10 supports loads by metal to metal contact when there is no relative motion. During normal operation, the spinning of the journal 16 sets up a steady pressure field around the clearance spaces which pushes the journal and sleeve apart and thus prevents metal to metal contact. The hydrodynamically pressurized film provides the stiffness needed to support the radial load of the disk, motor and associated hardware. Note that the hydrodynamic film stiffness is a measure of the resistance of the clearance space to change size under the influence of a load. supported by the hydrodynamic pressure field in the clearance spaces 28 between the thrust plate faces and the sleeve portion 14. The amount of separation between the thrust plate faces and sleeve is controlled by the hydrodynamic film stiffness and the applied axial load (usually the weight of the entire rotating assembly). Pressure building geometries such as the relief pattern 4 shown in FIG. 2 are employed to generate film stiffness of sufficient magnitude.

The sealing of the lubricant within the hydrodynamic bearing 10 will now be described in conjunction with FIGS. 1, 4 and 5. There are two types of seals in the bearing 10, namely, static and dynamic seals. Static seals 26 which are preferably 0 ring seals prevent lubricant leakage between the thrust plates 22 and 24 and the journal 16. They are called static seals in that there is no relative rotation or sliding between the thrust plates 22 and 24 and the journal 16. Dynamic sealing is required in the clearance space 36 between the thrust plates and the sleeve. These seals must not leak or generate solid debris. Sealing is provided by surface tension capillary seals in which a lubricant-air interface 38 provides the surfaces forces.

As shown in FIG. 5, two components, the liquid gas (lubricant air) interface 38 and the solid surfaces of the thrust plates and sleeve make up each seal. Surface tension forces directed axially away from each end of the bearing indicated by the arrows 40 balance the forces due to pressure differentials which may be applied across each interface as indicated by the arrows 42 and a force due to gravity. The magnitude of the axial surface tension forces depends on the wetted perimeter of the liquid-gas interface 38, the surface tension (a property of the liquid lubricant), the taper angle and the contact angle. The forces due to pressure differentials are dependent on the pressure differentials and the lubricant-air interface area. Since the solid boundaries of the seal are tapered, the wetted perimeter and area of the interface vary with the axial position of the interface. As a result, the axial position of the interface varies with pressure differences applied to the bearing until the surface tension forces and pressure forces balance. Stability of the interface is sensitive to the angle of taper. A taper angle of approximately 2° has been experimentally determined to be optimum for insuring interface stability.

During bearing 10 operation, it is necessary that the pressures be nearly the same at the lubricant side of each lubricant air interface 38. This pressure balance is provided by the pressure equalization ports 30 and 32 which connect the clearance spaces 18 and 28. Without the equalization ports, pumping actions inside the bearing may set up pressure differentials. For example, the thrust plates 22 and 24 produce an inwardly directed radial pumping action. The equalization ports tend to equalize the pressures. Furthermore, the passages should maintain a constant radial position in the neighborhood of the thrust plates. This requirement prevents large pressure gradients from developing in the passages due to the centrifugal pumping effects caused by the thrust plates. The bearing 10 is thus pressure balanced and does not tend to pump the lubricant in a preferential manner through one seal or the other. Only the external pressure differential across the bearing, therefore, influences the position of the interfaces. The equalization ports coupled with the surface tension dynamic seals result in a hydrodynamic bearing of higher precision with respect to runout relative to conventional bearing designs.

Figure 6:
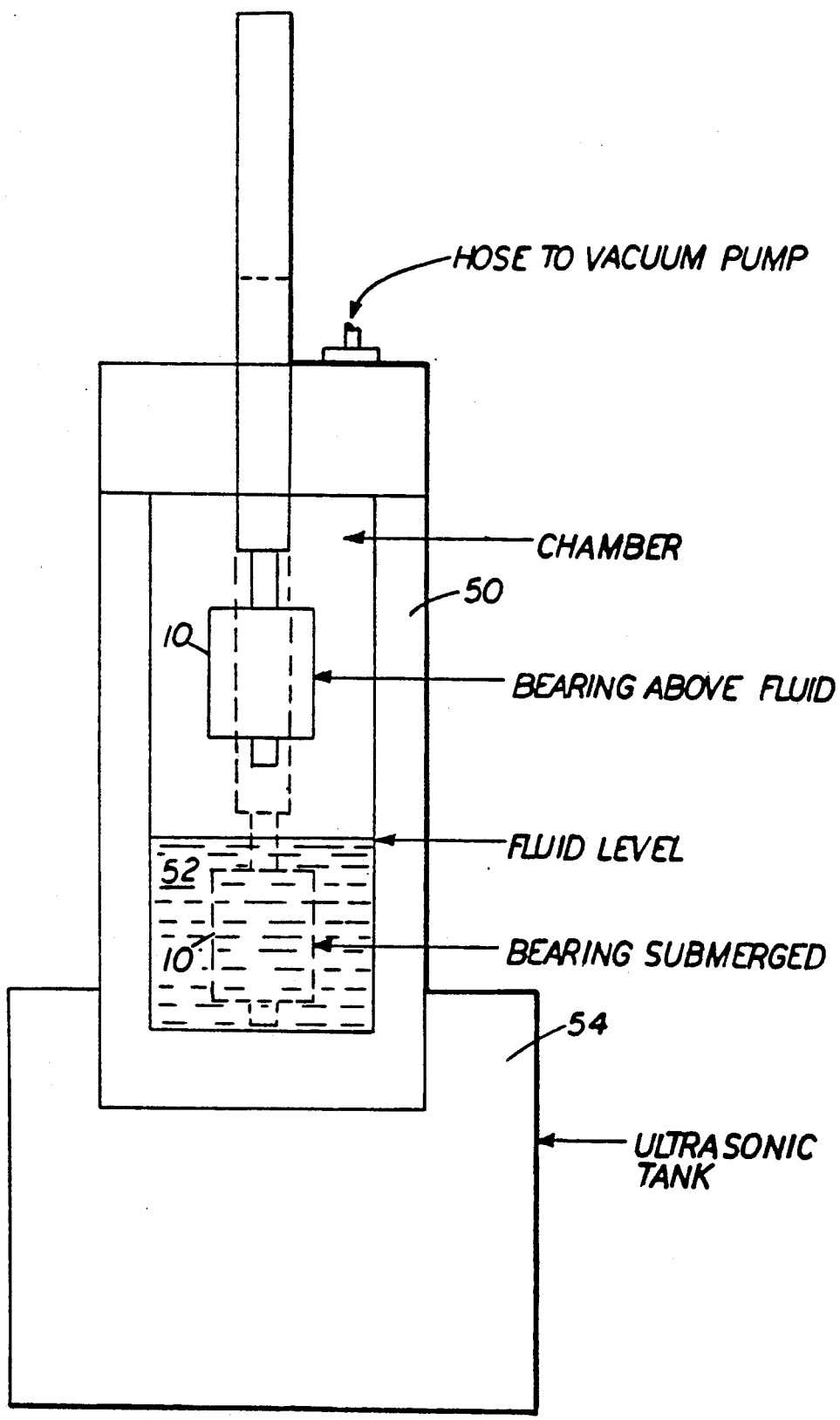
FIG. 6 is a schematic illustration of the method of filling the bearing with lubricant.

Lubricant must be introduced into the bearing in such way that a minimal amount of air is trapped in the bearing. This is necessary because trapped air in the bearing expands as the bearing heats up and tends to push the lubricant out of the bearing. A method for filling the bearing with lubricant so as to minimize the amount of trapped air will be described in conjunction with FIG. 6. First of all, the bearing 10 is placed within a vacuum chamber 50 above the level of a liquid lubricant 52. The vacuum chamber 50 is then evacuated to a suitable pressure below atmospheric such as 5 μ of mercury. The bearing 10 is then submerged within the lubricant 52, after which the pressure in the chamber 50 is allowed to rise to atmospheric pressure. As the pressure rises, lubricant is forced into the bearing through the clearance spaces between the thrust plates and sleeve. Residual air bubbles in the bearing may be removed by applying ultrasonic energy to the chamber 50 within an ultrasonic tank 54. If necessary, additional residual air may be removed by repeatedly cycling of the pressure in the chamber 50 between a high and a low pressure.

Figure 7:
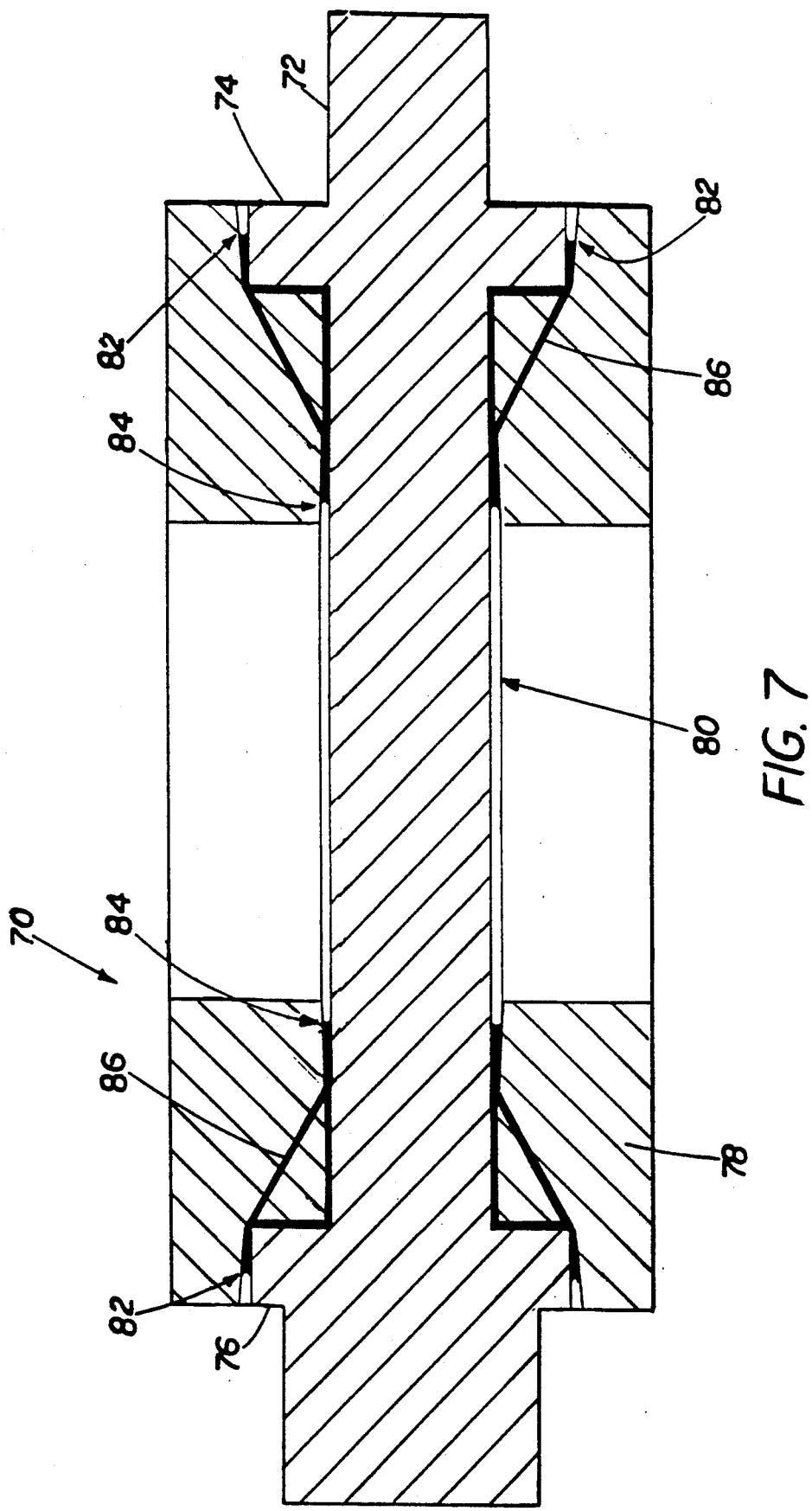
FIG. 7 is a cross sectional view of a particularly preferred embodiment of the present invention.

FIG. 7 is a particularly preferred embodiment of the invention having several advantages as compared to the embodiment of FIG. 1. A bearing 70 includes a shaft 72 with thrust plates 74 and 76. The shaft 72 with attached thrust plates 74 and 76 rotates within a sleeve 78. The sleeve 78 includes a portion having increased inside diameter to create an air space 80. The bearing 70 includes external surface tension seals 82 and internal surface tension seals 84. The external surface tension seals 82 and internal surface tension seals 84 are connected by pressure equalization ports 86. The surface tension seals 82 and 84 and the pressure equalization ports 86 are filled with a lubricant. As with the embodiment of FIG. 1, the surface tension seals are created by diverging, axially extending surfaces.

The embodiment of FIG. 7 results in reduced evaporation rate of the lubricant from the seals. When the orientation of a bearing changes, the position of the surface tension seals along the spin axis also changes. In the case in which the oil air interface moves into the bearing, a film of oil is left on the region of the metal which was previously covered by the lubricant of the seal. This film of oil is then exposed to air and has a large amount of surface area compared to the seal oil air interface area. As a result of this increased surface area, the evaporation of the oil is increased and the life of the lubricant supply is reduced.

When a bearing is not operating, the position of the seals is determined by the pressure difference between the two sealed regions of the bearing which are connected together by the pressure equalization port or balance tube. The internal fluid pressure difference is controlled by the elevation difference between the two regions of the bearing and the specific weight of the lubricant fluid. The external pressure differences due to variations in air pressure around the bearing are usually negligible. Thus seal position and the change in seal position are controlled primarily by the elevation changes in the bearing. Splitting the lubricated regions of the bearing of FIG. 7 into two separate and shorter zones reduces the range of possible elevation differences and also the resulting range of seal position changes. This design thus reduces the wetted area of the bearing and the evaporation rate.

The bearing of FIG. 7 also provides higher moment stiffness. The higher stiffness results from the fact that the length of the bearing can be made longer relative to the bearing of FIG. 1. Moment stiffness is proportional to the length of the bearing squared when all of the other bearing characteristics are held constant. The bearing of FIG. 7 can be longer than the bearing of FIG. 1 because the seal areas are split into separate zones so that the central region of the bearing can be lengthened without affecting the behavior of the seals.

Another advantage of the embodiment of FIG. 7 is faster thermal transient response of the lubricant. It is desirable to have the lubricant come up to temperature as fast as possible during start up. When the lubricant oil is warm, it has a lower viscosity than when it is cold and thus the torque requirements are less when the oil is warm. Accordingly, when the oil can be made to heat up quickly, a shorter period of high load on the driving motor results which is very desirable for some applications. The faster thermal response of the bearing of FIG. 7 results from the reduction of oil volume in this bearing design and the resulting increase in bearing power to oil volume ratio.

Figure 8:
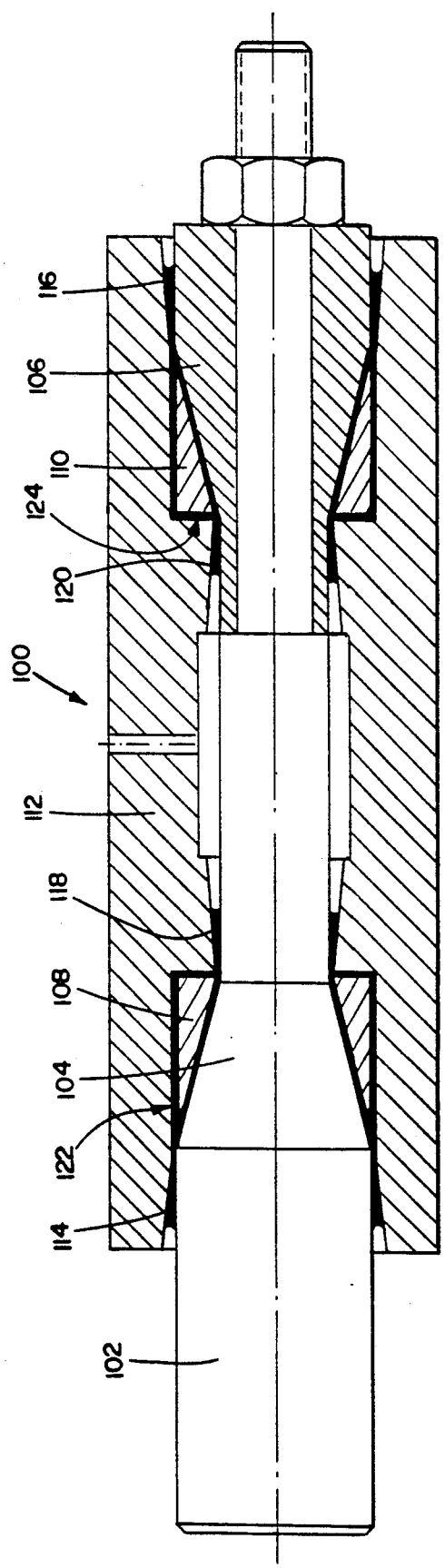
FIG. 8 is a cross-sectional view of an embodiment of the invention utilizing a tapered shaft.

FIG. 8 is yet another embodiment of the present invention. A bearing 100 includes a spindle shaft 102 which has tapered portions 104 and 106. These tapered portions mate with tapered bearing shells 108 and 110 which reside within a spindle housing or sleeve 112. The spaces between the tapered shaft and tapered bearing shells are filled with a liquid lubricant. The lubricant is sealed by external surface tension or capillary seals 114 and 116, and internal capillary seals 118 and 120. An equalization port 122 connects the seals 114 and 118, and an equalization port 124 connects the seals 116 and 120.

Because of the tapered surfaces, both radial and axial loads are supported by the bearing. The spindle housing and shaft surfaces are a single contiguous unit without any parting line. No 0 ring seals are required since no secondary leakage is possible with the tapered arrangement. The tapered portions of the bearing shaft or the tapered bearing shell surfaces include herringbone patterns which generate a net liquid flow due to machining tolerances. This net liquid flow in the bearing is compensated for by a flow in the opposite direction through the equalization ports 122 and 124.

The bearing shells 108 and 110 have grooves on their outer surfaces. These bearing shells are shrink fitted into the spindle housing 112 and the grooves cooperate with the housing 112 to create the equalization ports.

What is claimed is:

1. A hydrodynamic bearing comprising:
   a relatively rotatable shaft disposed within a sleeve, the shaft and sleeve including mating tapered portions at each end of the bearing defining lubricant fillable clearance spaces for supporting radial and axial loads, each clearance space sealed by an internal and an external surface tension dynamic seal, and further including pressure equalization ports connecting the internal and external seals.

2. The bearing of claim 1 wherein the internal and external surface tension dynamic seals comprise diverging, axially extending surfaces of the shaft and sleeve.

3. The bearing of claim 2 wherein the diverging surfaces are straight tapers.

4. The bearing of claim 3 wherein the straight tapers taper approximately $2^0$.

5. The bearing of claim 1 wherein the shaft and sleeve are each a continuous unit with no parting line.

6. The bearing of claim 1 wherein the sleeve includes separate bearing shells having the tapered surfaces.

7. The bearing of claim 6 wherein the bearing shells include grooves which cooperate with the sleeve, to form the equalization ports.

8. A hydrodynamic bearing comprising:
   a shaft/thrust plate combination disposed within a sleeve for relative rotation, forming a first clearance space between the shaft and the sleeve and a second clearance space between the thrust plate and the sleeve, the clearance spaces being fillable with a liquid lubricant, an extension of the thrust plate being exposed to air;
   including at least one pressure equalization ports defined at least in part by the sleeve and/or the shaft/thrust plate combination for connecting the first clearance space and the second clearance space; and
   wherein each end of the bearing includes both internal and external surface tension dynamic seals with an air space disposed between the ends.

9. The bearing of claim 8 wherein the external surface tension dynamic seals comprise diverging, axially extending surfaces of the thrust plate and sleeve and the internal surface tension dynamic seals comprise diverging, axially extending surfaces of the shaft and sleeve.

10. The bearing of claim 9 wherein said at least one pressure equalization port connects the internal and external surface tension seals.

11. The bearing of claim 10 wherein the pressure equalization ports are disposed diagonally.

12. The bearing of claim 9 wherein the diverging surfaces are straight tapers.

13. The bearing of claim 12 wherein the taper is approximately 2°.

14. A hydrodynamic bearing comprising:
   a shaft/plural thrust plate combination disposed within a sleeve for relative rotation, an extension of each of the thrust plates being exposed to air, a first clearance space being formed between the shaft and the sleeve and, for each respective thrust plate, a second clearance space being formed between the respective thrust plate and the sleeve, the clearance spaces being fillable with a liquid lubricant;
   including at least one pressure equalization port defined at least in part by the sleeve and/or shaft/thrust plural plate combination and connecting the first clearance space and each respective second clearance space, and
   wherein each end of the bearing includes both internal and external surface tension dynamic seals with an air space disposed between the ends.

15. A hydrodynamic bearing comprising:
   a shaft in a combination including at least one thrust plate, the shaft/thrust plate combination disposed within a sleeve for relative rotation, forming a first clearance space between the shaft and the sleeve and a second clearance space between the thrust plate and the sleeve, the clearance spaces being intended to be filled with a liquid lubricant, an external face of the thrust plate being exposed to an outside environment;
   the thrust plate and sleeve having cooperating axially extending surfaces which diverge as they open out axially to the outside environment, the outwardly diverging surfaces configured for forming with liquid lubricant a surface tension dynamic seal at the lubricant/outside interface, and,
   the clearance spaces configured such that a differential in lubricant pressure in at least one of the clearance spaces relative to pressure of the outside environment can be equalized by movement of the seal along its associated taper until surface tension and pressure forces are in balance at least during said relative rotation.

16. The bearing of claim 15 including a plurality of pressure equalization ports, defined at least in part by the sleeve, the ports including axially extending passageways in communication with radially extending passageways.

17. The bearing of claim 16 wherein the radially extending passageways are located near the center of the bearing.

18. The bearing of claim 16 wherein the axially extending passageways are equally spaced around the sleeve.

19. The bearing of claim 15 including four equalization ports.

20. The bearing of claim 15 further including a static seal between the shaft and the thrust plate.

21. The bearing of claim 20 wherein the static seal is an O-ring seal.

22. The bearing of claim 15 further including relief patterns in opposed sleeve/thrust plate faces to generate inwardly directed radial forces.

23. The bearing of claim 15 further comprising a second thrust plate wherein the shaft is in combination with at least two thrust plates, and further defining a second clearance space between said second thrust plate and the sleeve;
   each thrust plate and sleeve having respective cooperating axially extending surfaces which diverge as they open out axially to the outside environment in a straight taper of approximately 2°, the outwardly diverging surfaces of the taper configured for forming with liquid lubricant a surface tension dynamic seal at the lubricant/outside interface; and
   pressure equalization ports connecting the first and the second clearance spaces.

24. The bearing of claim 23 wherein the shaft comprises tapered portions which at least in part define said thrust plates.

25. The bearing of claim 24 wherein the tapered portions appear as truncated cones, with the truncated surface of one cone facing the truncated surface of the other.

26. The bearing of claim 15 wherein pressure equalization ports connect the clearance spaces.

27. The bearing of claim 15 further comprising a second set of cooperating axially extending and outwardly diverging surfaces, each set being disposed to form a respective surface tension dynamic seal with liquid lubricant, with pressure equalization ports defined at least in part by the sleeve for connecting the clearance spaces to facilitate pressure equalization.

28. The bearing of claim 15 wherein the taper is approximately 2°.

29. The bearing of claim 15 wherein the sleeve is a cylindrical sleeve including a portion having a smaller inside diameter.

30. A hydrodynamic bearing comprising a cylindrical sleeve including a portion having a smaller inside diameter;
   a shaft including a portion having a diameter adapted to form a first clearance space with respect to the smaller diameter portion of the sleeve;
   a pair of thrust plates on the shaft forming second clearance spaces with respect to radially extending faces from the smaller diameter portion of the sleeve, the respective external faces of the thrust plates being exposed to air, the clearance spaces being for receiving a lubricant;

the smaller diameter portion of the sleeve including passageways interconnecting the first and second clearance spaces; and each thrust plate paired with the sleeve for cooperatively defining axially extending surfaces which diverge from each other toward the ends of the bearing in a straight taper for forming respective surface tension seals with the lubricant.

31. The bearing of claim 30 wherein opposed sleeve/thrust plate faces include relief patterns to generate inwardly directed radial forces.

32. The bearing of claim 30 herein the taper is approximately 2°.

33. The bearing of claim 32 wherein a respective thrust plate is defined near a respective end of the shaft.

34. The bearing of claim 30 wherein the smaller diameter portion of the sleeve includes plural axially extending passageways, at least one axial passageway communicating with at least one radial passageway.

35. The bearing of claim 30 wherein each thrust plate comprises a truncated cone with the surface of truncation of each cone facing each other.

36. A hydrodynamic bearing comprising a cylindrical sleeve including a portion having a smaller inside diameter;

a shaft including a portion having a diameter adapted to form a first clearance space with respect to the smaller diameter portion of the sleeve;

a pair of thrust plates on the shaft forming second clearance spaces with respect to radially extending faces from the smaller diameter portion of the sleeve, the respective external faces of the thrust plates being exposed to air, the clearance spaces being for receiving a lubricant;

the smaller diameter portion of the sleeve including passageways interconnecting the first and second clearance spaces;

each thrust plate paired with the sleeve for cooperatively defining axially extending surfaces which diverge from each other toward the ends of the bearing in a straight taper for forming respective surface tension seals with the lubricant; and wherein each thrust plate comprises a truncated cone with the surface of truncation of each cone facing each other.

37. The bearing of claim 36 wherein opposed sleeve/thrust plate faces include relief patterns to generate inwardly directed radial forces.

38. The bearing of claim 36 wherein the taper is approximately 2°.

39. A hydrodynamic bearing comprising
a shaft disposed within a sleeve for relative rotation thereof, the shaft and sleeve including mating portions defining a lubricant fillable clearance space for supporting radial and axial loads, said shaft and sleeve having cooperating axially extending surfaces that diverge in a tapered configuration as they extend axially, the diverging surfaces configured for forming with liquid lubricant, at an interface between said lubricant and an outside environment, an external surface tension dynamic seal for sealing said clearance space, said clearance space configured such that a differential in lubricant pressure in said clearance space relative to pressure of the outside environment is equalized by movement of said external seal along its associated taper until surface tension and pressure forces are in balance.

40. The bearing of claim 39 wherein said clearance space comprises two regions, one of said regions comprising a portion for supporting axial loads and another one of said regions comprising a portion for supporting radial loads.

41. The bearing of claim 39 wherein said clearance space comprises two regions and wherein said bearing further comprises pressure equalization ports defined at least in part by said sleeve and connecting said regions of said clearance space.

42. The bearing of claim 41 wherein said equalization ports comprise at least one axial passageway that connects with at least one radial passageway.

43. The bearing of claim 41 wherein said equalization ports comprise at least one passageway disposed diagonally through said sleeve.

44. The bearing of claim 39 further comprising at least one thrust plate in combination with said shaft, said shaft/thrust plate combination defining a first portion of said clearance space between said shaft and said sleeve and a second portion of said clearance space between said thrust plate and said sleeve, said thrust plate and said sleeve having said cooperating axially extending, diverging surfaces.

45. The bearing of claim 39 further comprising
a pair of thrust plates in combination with said shaft, said shaft/thrust plate combinations each defining a first portion of said clearance space between said shaft and said sleeve and a second portion of said clearance space between said thrust plate and said sleeve, each of said thrust plates being paired with said sleeve for defining said cooperating axially extending, diverging surfaces, whereby a said surface tension dynamic seal is disposed between each of said thrust plates and said sleeve.

46. The bearing of claim 45 further comprising pressure equalization ports defined at least in part by said sleeve and connecting said surface tension dynamic seals.

47. The bearing of claim 39 wherein said shaft and sleeve further include, inwardly of said external surface tension dynamic seal, second cooperating axially extending surfaces that diverge axially inwardly and open to an internal air reservoir between said shaft and said sleeve, said inwardly diverging surfaces configured for forming with liquid lubricant, at an interface between said lubricant and said internal air reservoir an internal surface tension dynamic seal for sealing said clearance space.

48. The bearing of claim 47 further comprising pressure equalization ports defined at least in part by said sleeve and connecting said internal and external surface tension dynamic seals.

49. A hydrodynamic bearing comprising
a shaft disposed within a sleeve for relative rotation thereof, said shaft and said sleeve comprising mating portions at an end of the bearing, said mating portions defining lubricant fillable clearance space for supporting loads;

an external surface tension dynamic seal for said lubricant and formed between said clearance space and an outside environment;

an internal air reservoir located between said shaft and said sleeve inwardly of said external seal and said clearance space;

an internal surface tension dynamic seal for said lubricant and formed between said clearance space and said internal air reservoir; and pressure equalization ports, comprising passageways defined at least in part by said sleeve, connecting said internal surface tension dynamic seal with said external surface tension dynamic seal.

50. The bearing of claim 49 wherein said clearance space is configured to support both radial and axial loads.

51. The bearing of claim 50 further comprising at least one thrust plate in combination with said shaft, said shaft/thrust plate combination defining a first portion of said clearance space between said shaft and said sleeve, for supporting radial loads, and a second portion of said clearance space between said thrust plate and said sleeve, for supporting axial loads.

52. The bearing of claim 49 wherein said internal surface tension dynamic seal and said external surface tension dynamic seal are axially disposed.

53. The bearing of claim 52 wherein said internal surface tension dynamic seal and said external surface tension dynamic seal each comprises diverging, axially extending surfaces of said shaft and said sleeve.

54. A hydrodynamic bearing comprising a shaft disposed within a sleeve for relative rotation thereof, said shaft and sleeve comprising mating portions at each end of the bearing defining lubricant fillable clearance spaces for supporting loads;

a pair of external surface tension dynamic seals for said lubricant, each associated with one of said clearance spaces, disposed near an end of said bearing, and formed between said associated clearance space and an outside environment;

an internal air reservoir located between the shaft and the sleeve inwardly of each said external seal and each said clearance space;

a pair of internal surface tension dynamic seals for said lubricant, each associated with one of said external seals and one of said clearance spaces, disposed near an end of said bearing, and formed between said associated clearance space and said internal air reservoir; and pressure equalization ports, comprising passageways defined at least in part by said sleeve, connecting each one of said internal surface tension dynamic seals with its associated external surface tension dynamic seal.

* * * * *

UNITED STATES PATENT AND TRADEMARK OFFICE
CERTIFICATE OF CORRECTION

PATENT NO. : 5,112,142
DATED : May 12, 1992
INVENTOR(S) : Titcomb et al.

It is certified that error appears in the above-indentified patent and that said Letters Patent is hereby corrected as shown below:

TITLE PAGE

Under Inventors: add --Max Werner Schaule of Mindelheim, Federal Republic of Germany--.

In the Abstract, line 18, "cotaminating" should be --contaminating--.

Column 2, line 55, "O ring" should be --O-ring--.

Column 3, line 39, insert --2-- after "FIG.".

Column 3, line 67, begin a new paragraph as follows: --Axial loads along the journal 16 spin axis are-- before "supported".

Signed and Sealed this

Nineteenth Day of April, 1994

Attest:

BRUCE LEHMAN

Attesting Officer     Commissioner of Patents and Trademarks